Aug. 25, 1959

H. C. RISING 2,900,804

APPARATUS FOR MAKING ICE CUBES

Filed May 21, 1957

HENRY C. RISING,
INVENTOR.

BY
ATTORNEY.

Aug. 25, 1959 H. C. RISING 2,900,804
APPARATUS FOR MAKING ICE CUBES
Filed May 21, 1957 6 Sheets-Sheet 2

Henry C. Rising,
INVENTOR.

BY
Elwood McKendrick
ATTORNEY.

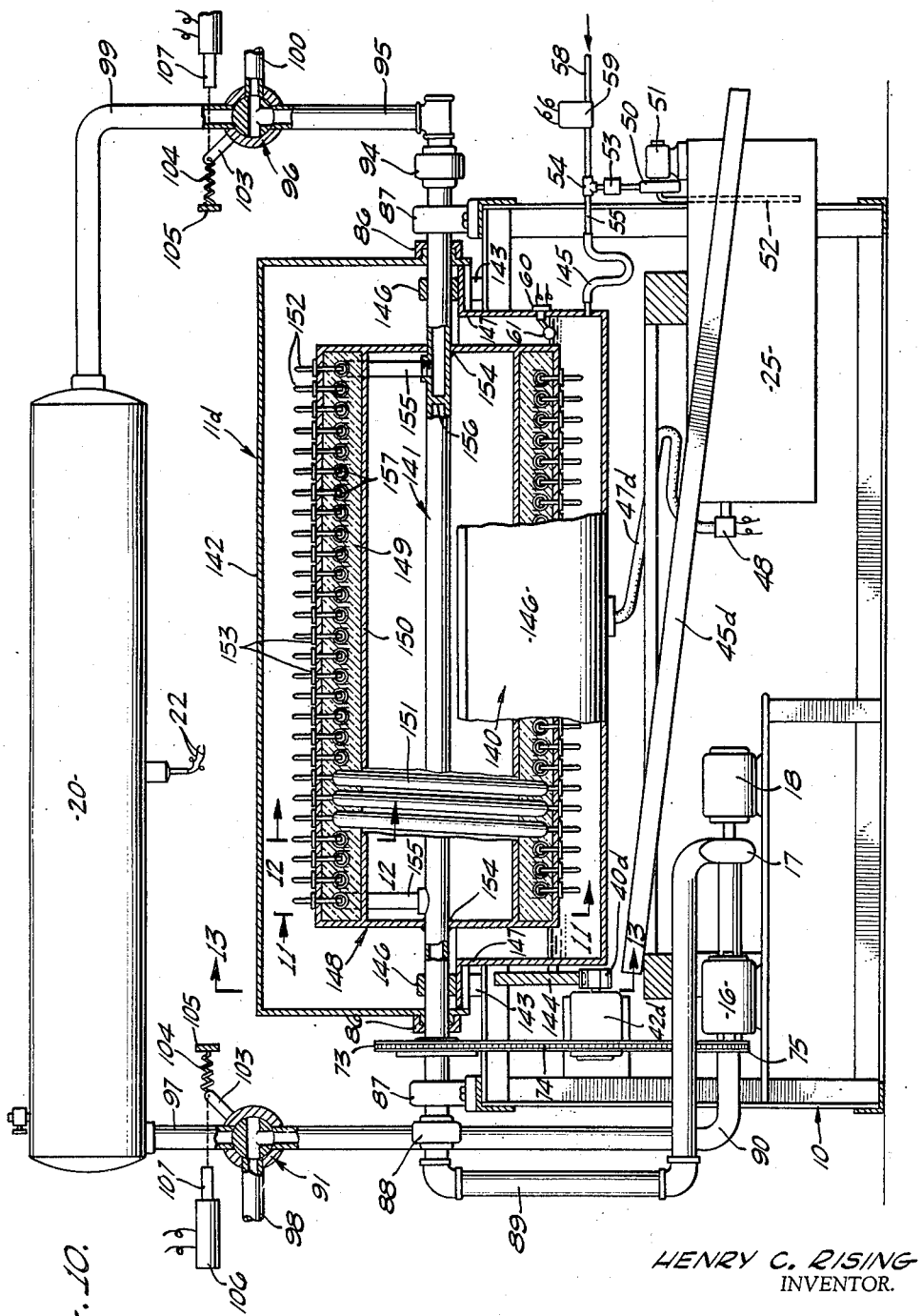

Aug. 25, 1959     H. C. RISING     2,900,804
APPARATUS FOR MAKING ICE CUBES
Filed May 21, 1957     6 Sheets-Sheet 4
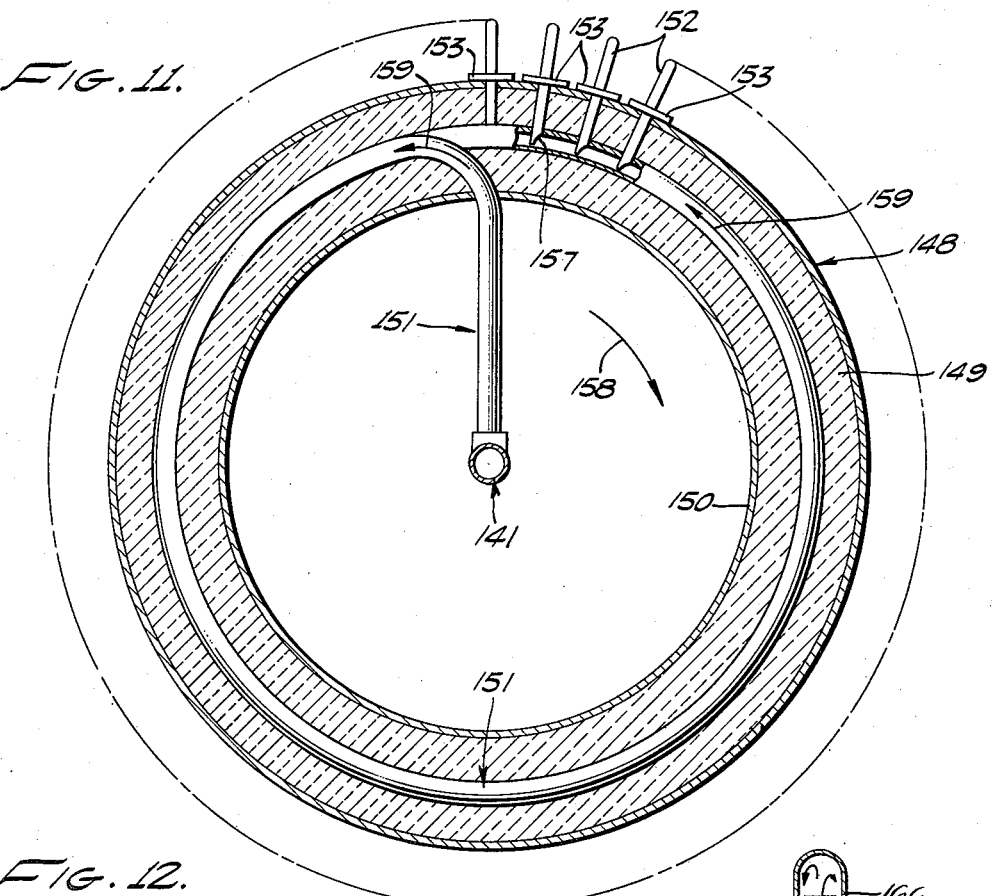
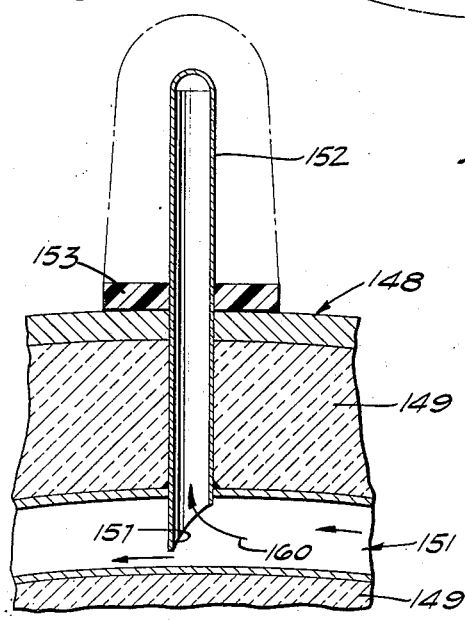
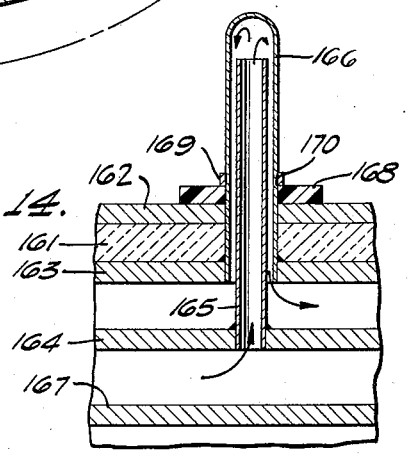
HENRY C. RISING
INVENTOR.
BY
ATTORNEY Aug. 25, 1959      H. C. RISING      2,900,804
APPARATUS FOR MAKING ICE CUBES
Filed May 21, 1957      6 Sheets-Sheet 5

HENRY C. RISING
INVENTOR.

BY
ATTORNEY

Aug. 25, 1959　　　　　H. C. RISING　　　　　2,900,804
APPARATUS FOR MAKING ICE CUBES
Filed May 21, 1957　　　　　　　　　　　　6 Sheets-Sheet 6

HENRY C. RISING
INVENTOR.

BY
ATTORNEY

2,900,804

APPARATUS FOR MAKING ICE CUBES

Henry C. Rising, Glendale, Calif.

Application May 21, 1957, Serial No. 660,993

31 Claims. (Cl. 62—157)

This invention relates to apparatus for freezing water to form relatively small blocks of ice or ice cubes on a commercial scale and is directed to the type of ice-making apparatus in which a drum with refrigerant therein rotates on a substantially horizontal axis with the periphery of the drum at least partially immersed in a body of fresh water. The periphery of the rotary drum is provided with a plurality of ice-forming elements in heat exchange relationship with the interior of the drum, these elements being usually in the form of receptacles formed in the peripheral wall of the drum. As the drum with refrigerant therein rotates in the body of water, small blocks or cubes of ice form progressively at the various ice-forming elements, one incremental layer of ice being added on each rotation of the drum. After the freezing operation is completed, warm fluid is usually circulated through the interior of the rotary drum to release the ice bodies from the drum by a shallow thawing action.

One object of the present invention is to provide highly effective circulation of refrigerant through the interior of the rotary drum. One feature of the invention in this regard is the provision of a suitable pump to force fluid into the rotary drum under pressure to cause circulation through the drum at relatively high velocity. A second feature is the provision of a fluid passage arrangement inside the rotary drum that directs the inflowing refrigerant uniformly over the inner circumferential area of the drum. In the preferred practice of the invention, the fluid passage arrangement is provided by two cylinders inside the rotary drum co-operating to form an annular space for the inflowing fluid, the outer of these two cylinders being perforated to discharge the fluid radially outward against the surrounding inner circumferential wall of the drum.

Another object of the invention is to provide for the discharge of ice cubes from the apparatus with the ice cubes substantially free from water. In general, this object is attained by draining the body of water out of the tank at the end of a freezing operation and then discharging the ice cubes from the tank, preferably by gravity. In this regard, a feature of the preferred practice of the invention is the provision of an auxiliary tank into which the body of water used in the main tank for the freezing operation is drained temporarily to permit the discharge of the frozen product, the water being returned from the auxiliary tank to the main tank for the next freezing operation.

A further object of the preferred practice of the invention is to provide an apparaus of this character that will operate in a largely automatic manner with minimum attention and supervision. In the preferred practice of the invention, an electrical control system including a suitable timer is provided to carry repeated cycles of operation in a completely automatic manner. A typical operating cycle, for example, may start with the drum that carries the ice-forming elements rotating partially immersed in the water and with refrigerant circulating through the drum to cause the required freezing action. After a predetermined period of time sufficient to permit the formation of the desired ice cubes, the timer operates an electrically controlled drain valve to drain the tank of water and also operates electrically actuated valve means to cut off the circulation of refrigerant and to substitute circulation of warm fluid through the drum for thawing action to release the ice cubes. After a further interval of time sufficient to permit complete drainage of the tank and to permit complete release of all the ice cubes from the rotary drum, the timer energizes an electrically actuated means to cause the water-free ice cubes to be discharged from the tank. Finally, after a further interval of time, the tank is again filled with the required amount of water and circulation of refrigerant through the rotary drum is resumed to start a new freezing cycle. Such an automatic control arrangement may also include automatic means to add new water to replace the water lost by the freezing procedure.

A still further object of the preferred practice of the invention is to provide such an ice cube apparatus in the form of a semiportable unit that may be connected to any suitable source of refrigerant. Such a unit, for example, may include in one unified structure: a main tank to hold the body of water; an auxiliary tank for temporary storage of the water between freezing operations; the hollow rotary drum that carries the peripheral ice-forming elements; a pump for forced circulation through the rotary drum; a second pump for water flow between the two tanks; a suitable source of heated fluid; valve means for providing alternate circulation of refrigerant and warm fluid through the rotary drum; and, finally, the required electrical control system.

A further object of an alternate form of the invention is to freeze ice bodies by special ice-forming element comprising fingers extending radially outward from the peripheral wall of the rotary drum, the fingers being hollow for the circulation of refrigerant therethrough. Such an arrangement causes the desired small bodies of ice to be built up quickly around the radially extending fingers and has the added advantage of providing a relatively small area of metal in contact with the formed ice bodies. Since the areas in which the ice bodies are bonded to the rotary drum are relatively small, the circulation of relatively warm fluid through the hollow fingers causes the frozen product to be quickly released from the drum.

The various objects, features and advantages of the invention may be readily understood from the following detailed description considered with the accompanying drawings.

In the drawings, which are to be regarded as merely illustrative:

Fig. 10 is a view, partly in side elevation and partly in section, of an alternative embodiment of the invention having some of the same component parts as that shown in Fig. 1;

Fig. 11 is a sectional view of a freezing drum taken on the line 11—11 shown in Fig. 10;

Fig. 12 is an enlarged sectional view of a portion of an ice-making drum taken on the line 12—12 shown in Fig. 10;

Fig. 14 is an enlarged sectional view of an alternative embodiment of an ice-making element constructed in accordance with the invention;

Figures 1, 2:
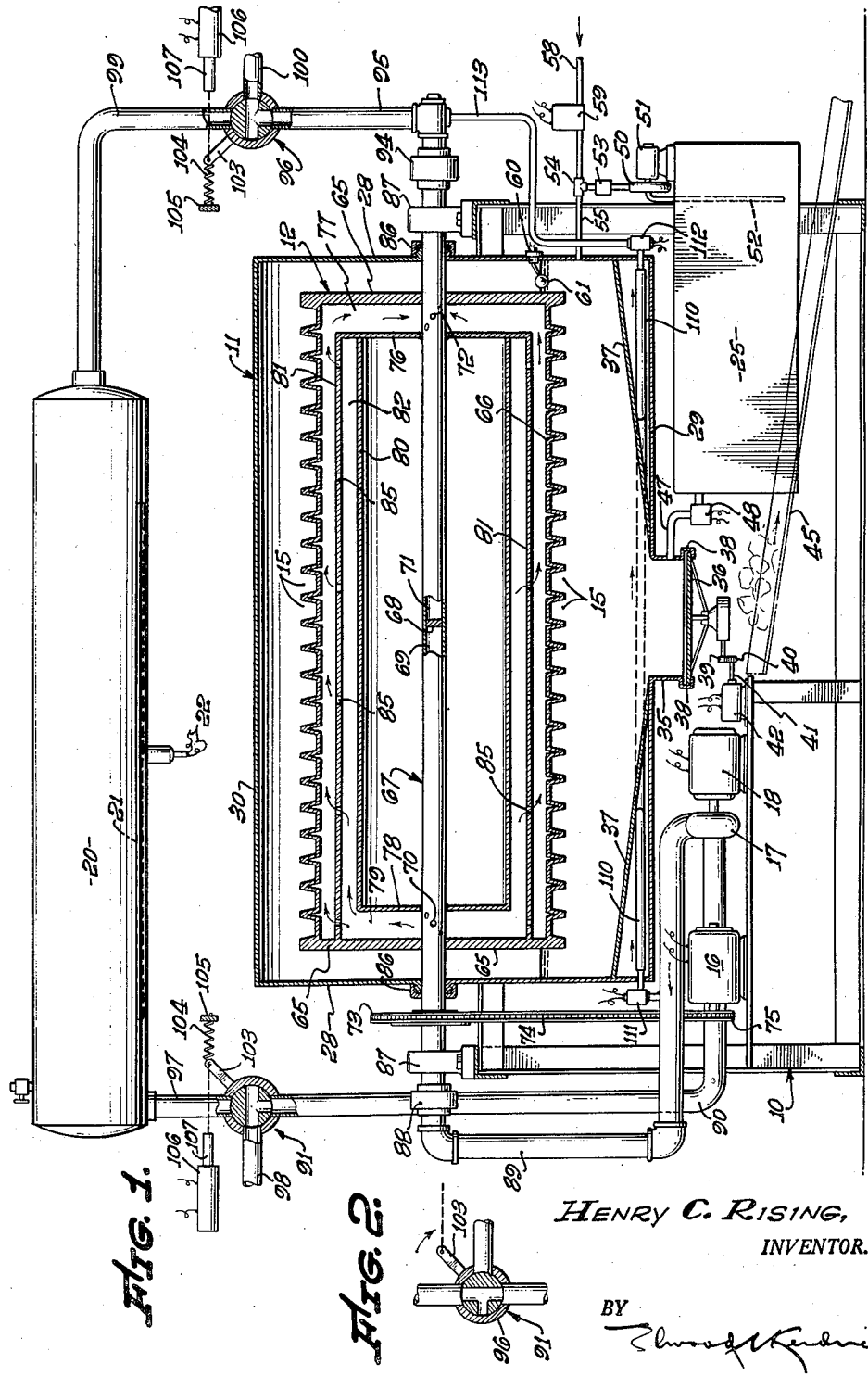
Fig. 1 is a view, partly in side elevation and partly in section, of a selected embodiment of the invention, with some of the components of the control system shown schematically.
Fig. 2 is a schematic view of a 3-way valve of the apparatus shown in an alternate position.
Figure 3:
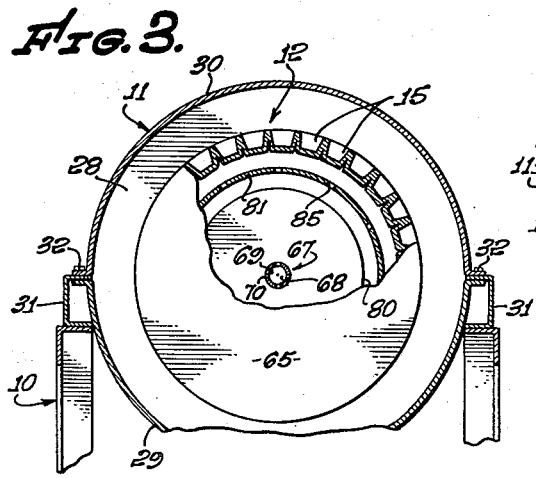
Fig. 3 is a fragmentary view, partly in end elevation and partly in section, showing the construction of a portion of the apparatus.

Fig. 1 shows how the invention may be embodied in a semiportable unit that is complete and self-sufficient except for provision of the required refrigerant and may be placed in operation merely by making connection with any suitable source of refrigerant. Such a unit may be connected, for example, to the refrigeration system of a large hotel for the quantity production of ice cubes. Obviously, the unit may include its own independent source of refrigerant, if desired. The component parts of the apparatus are carried by a single frame, generally designated by numeral 10, which permits the assembly to be transported and installed as a unit. Installation consists simply of placing the assembly at an appropriate location and making the necessary pipe connections with the outside source of refrigerant.

The principal parts of this selected embodiment of the invention include: a cylindrical tank, generally designated by numeral 11, adapted to hold a body of pure fresh water; a horizontally positioned cylindrical drum, generally designated by numeral 12, that is adapted to rotate with at least a portion of its periphery immersed in the body of water; a plurality of ice-forming elements 15 formed by the peripheral wall of the rotary drum 12, a motor 16 for rotating the drum 12; a pump 17 actuated by a motor 18 for forced circulation of refrigerant such as brine or Freon through the interior of the rotary drum 12; and a suitable source of relatively warm fluid such as an elevated brine tank 20. This brine tank is provided with electrical heating coils 21 energized by a circuit including wires 22 for maintaining the brine at a desired elevated temperature. Preferably the unit also includes an auxiliary tank 25 into which water from the main tank 11 may be transferred for temporary storage at the end of a freezing operation.

The main water tank 11 has two circular end walls 28 and a cylindrical wall made in two sections, namely, a lower section 29 and an upper section 30. As shown in Fig. 2, these two cylindrical wall sections 29 and 30 may be attached to a pair of horizontal channel members 31 of the frame 10, with the upper section anchored by suitable screws 32. The screws 32 permit the upper section 30 to be removed when access to the interior of the tank is desired.

While any suitable arrangement may be provided for discharge of the small ice bodies or ice cubes from the main water tank 11, in this particular embodiment of the invention it is contemplated that the ice cubes will be released by gravity from the bottom of the main water tank and preferably will be so released when the tank has been drained of its water content. In the construction shown, the bottom of the main water tank 11 is provided with a downward extension 35 which is normally closed in a fluid tight manner by a suitable horizontal gate 36. Mounted inside the tank are suitable plates 37 that are positioned under the rotary drum 12 to receive the ice cubes released therefrom and are inclined to cause the ice cubes to gravitate to the downward extension 35.

The gate 36 for closing the downward extension 35 of the main water tank and which normally serves as the bottom wall for that extension, may be power-actuated for remote control. In this instance the gate slides in a pair of channels 38 and is provided with a rack 39. The rack 39 is engaged by a pinion 40 which is mounted on a shaft 41 of a suitable motor 42. When the gate 36 is moved to open position by energization of the motor 42, any ice cubes in the bottom of the drain tank are discharged by gravity through the downward extension 35 of the tank. The discharged cubes may be received by a suitable ramp or chute 45 down which the ice cubes gravitate to a desired discharge point.

At the end of each freezing operation, the water in the main tank 11 may be released through a drain pipe 47 that connects the downward extension 35 of the main tank 11 with the auxiliary tank 25 and is controlled by a suitable drain valve 48. Preferably the drain valve 48 is an electrically actuated valve, for example, a solenoid valve, for operation by remote control. Water may be returned from the auxiliary tank 25 to the main tank 11 by means of a suitable centrifugal pump 50 driven by a motor 51, the pump having an intake pipe 52 extending downward into the auxiliary tank. The discharge side of the centrifugal pump 50 is connected through a check valve 53 with a T-fitting 54, which fitting in turn is connected to the main water tank 11 by a pipe 55. For replenishing the water in the main tank 11 when required, a water supply pipe 58 controlled by an electrically actuated supply valve 59 may be connected to the T fitting 54 as shown. For the purpose of automatic control, the circuit for actuating the supply valve 59 may include a switch 60 actuated by a float 61 inside the main tank.

The rotary drum 12 has two circular end walls 65 and a generally cylindrical peripheral wall which is shaped to form the plurality of ice-forming elements 15. In this instance, the ice-forming elements 15 are in the form of small receptacles of a size to form suitably dimensioned ice cubes. Each of the receptacles has sloping side walls and a bottom wall 66, the bottom wall being smaller in area than the open end of the receptacle. The walls of the receptacles are made of a metal such as zinc that readily conducts heat and permits rapid heat transfer from water in the receptacles to the refrigerant inside the rotary drum.

The rotary drum 12 may be mounted on a suitable shaft generally designated by numeral 67, which shaft is of hollow construction to provide passages for fluid flow into and out of the rotary drum. In the particular construction shown, the shaft 67 is divided by a plug 68 into two sections, namely, an inflow section 69, having perforations 70 for flow of fluid into the rotary drum, and an outflow section 71 having perforations 72 for flow of refrigerant out of the drum. For power actuated rotation of the drum 12, a sprocket wheel 73 on the shaft 67 is connected by a sprocket chain 74 to a drive sprocket 75 on the shaft of the motor 16.

A feature of this particular embodiment of the invention is the use of cylindrical walls inside of the rotary drum 11 to co-operate with the hollow shaft 67 for the purpose of circulating fluid in a highly effective manner with uniform distribution of the fluid over the inner cylindrical wall of the rotary drum. In the construction shown, a radial wall 76 of circular configuration co-operates with one of the end walls 65 to form a radial outflow space 77 at one end of the drum in communication with the outflow perforations 72 in the outflow section 71 of the shaft. In like manner, a second radial wall 78, of smaller radial dimension at the other end of the drum, co-operates with the second end wall 65 to form a radial inflow space 79 in communication with the inflow perforations 70 in the inflow section 69 of the shaft. A cylindrical wall 80 interconnects the two radial walls 76 and 78 and a second cylindrical wall 81 of larger diameter connects the radial wall 76 with the end wall 65 at the opposite end of the tank. Thus, the two cylindrical walls 80 and 81 inside the rotary drum form a longitudinal annular passage 82 in communication with the radial inflow space 79. The outermost cylindrical wall 81 of these two cylindrical walls is provided with spaced openings 85 through which fluid flows radially outward against the inner circumferential wall of the rotary drum. The spaced openings 85 are located to serve as means to distribute the inflowing fluid uniformly over the inner surface of the peripheral wall of the rotary drum.

The hollow shaft 67 extends through suitable packing glands 86 in the two end walls 28 of the main water tank 11 and is supported by bearings 87 on the frame 10. The input end of the shaft is connected by a rotary joint 88 to a pipe 89 that in turn is connected to the discharge side of the previously mentioned circulation pump 17. The intake side of the circulation pump is connected by a pipe 90 to a 3-way valve 91. The output end of the hollow shaft is connected by a rotary joint 94 to a pipe 95 that leads to a second 3-way valve 96.

The 3-way valve 91 that is connected to the input end of the shaft 67 through the circulation pump 17 is connected to the hot brine tank 20 by a pipe 97 and is adapted for connection with the refrigerant source (not shown) by a refrigerant supply pipe 98. In like manner, the 3-way valve 96 on the outflow side of the apparatus is connected to the hot brine tank 20 by a return pipe 99 and is adapted for connection with the refrigerant source by a return pipe 100.

In the preferred practice of the invention, the two 3-way valves 91 and 96 are normally biased to the positions shown in Fig. 1, thus placing the refrigerant source in communication with both ends of the hollow shaft 67 for circulation of refrigerant through the rotary drum 12. To provide such bias, each of the two 3-way valves may be provided with an operating arm 103, and one end of a coiled spring 104 may be connected to the arm with the other end of the spring anchored to a fixed support 105. A suitable solenoid 106 positioned adjacent each of the 3-way valves has a core 107 operatively connected to the arm 103 of the valve, so that energization of the solenoid moves the valve out of its normal position to its alternate position in opposition to the resistance of the coiled spring 104. At the alternate position of each 3-way valve shown in Fig. 2, the hot brine tank 20 is in communication with the two ends of the hollow shaft 67 for circulation of warm brine through the rotary drum 12.

The manner in which the described apparatus operates may be readily understood from the foregoing description. With a body of water in the main water tank 11 and with the two 3-way valves 91 and 96 in the positions shown in Fig. 1, refrigerant is circulated through the rotary drum 12 by the circulation pump 17. The circulating refrigerant issuing from the shaft perforations 70 flows radially outward through the radial space 79 and then longitudinally through the annular passage 72 provided by the two cylindrical walls 80 and 81. From the annular passage 82, the refrigerant flows radially outward through the various openings 85 in the cylindrical wall 81, the refrigerant thus being directed in a uniformly distributed manner against the walls of the various ice-forming elements 15 on the periphery of the rotary drum 12. The refrigerant that has cooled the various ice-forming elements 15 then flows through the radial space 77 into the shaft perforations 72 for return to the refrigerant source through the second 3-way valve 96. During each rotation of the drum 12, the peripheral receptacles that constitute the ice-forming elements 15 are dipped into the body of water to pick up an increment of ice and eventually a small body or "cube" of ice of the desired size is formed at each of the receptacles.

The main water tank 11 is then drained by opening of the drain valve 48 to permit the water to flow into the auxiliary tank 25. At the same time, the two solenoids 106 are energized to change the two 3-way valves 91 and 96 to their alternate positions shown in Fig. 2 to place the hot brine tank 20 in communication with the hollow shaft 67. The circulation pump 17 effectively circulates the warm brine through the rotary drum to cause sufficient thawing action at each of the ice-forming elements 15 to cause the formed ice bodies or "cubes" to be released. The released ice bodies fall onto the inclined plates 37 to gravitate towards the downward extension 35 at the bottom of the tank 11. With the water completely drained out of the tank 11, the motor 42 is energized to shift the gate 36 to its open position thereby to permit gravity discharge of the ice cubes onto the inclined chute 45 and the cubes gravitate down the chute to the desired discharge point.

After the discharge of the ice cubes from the main water tank 11, the gate 36 is returned to its closed position by reverse energization of the motor 42, the motor 51 is energized to actuate the centrifugal pump 50 for return of water from the auxiliary tank 25 to the main tank, and the two solenoids 106 are de-energized to permit the two 3-way valves 91 and 96 to return to their normal positions for circulation of refrigerant through the rotary drum 12.

A feature of this particular embodiment of the invention is the use of auxiliary coils 110 in the main water tank 11 beneath the inclined plates 37 for the purpose of maintaining the temperature of the water close to the freezing point. It has been found that such additional cooling materially increases the rate of formation of the ice bodies at the receptacles 15 on the rotary drum. The two auxiliary coils 110 are in series with an electrically actuated inlet valve 111 and an electrically actuated outlet valve 112. The inlet valve 111 is connected directly to the discharge pipe 89 from the circulating pump 17 and the outlet valve 112 is connected by a pipe 113 to the previously mentioned pipe 95 on the input end of the hollow shaft 67. It is contemplated that when the two solenoids 106 are energized to shift from circulation of refrigerant through the drum to circulation of warm brine, the inlet valve 111 and the outlet valve 112 will be closed to prevent the hot brine from being circulated through the cooling coils 110.

Figure 4:
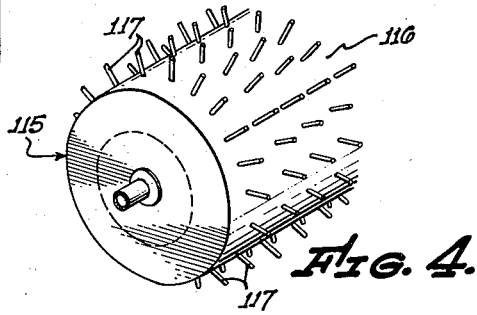
Fig. 4 is a perspective view of a portion of a rotary drum that may be used in an alternate practice of the invention, the drum being provided with ice-forming elements in the form of radial fingers around which individual bodies of ice form.
Figure 5:
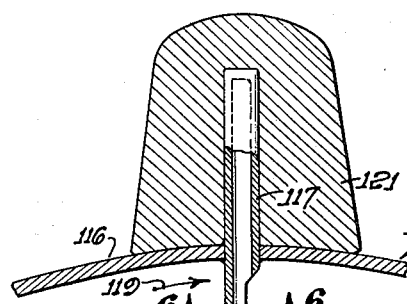
Fig. 5 is an enlarged view, partly in section, showing the manner in which a small body of ice forms around each of the hollow fingers.
Figure 6:
Fig. 6 is an inner end view of one of the hollow fingers on an enlarged scale, the view being taken as indicated by the line 6—6 in Fig. 5.

A modification of the invention consists in the substitution of the rotary drum 115 in Fig. 4 for the rotary drum 12 in Figs. 1 and 2. The rotary drum 115 is similar in construction to the rotary drum 12 and has the same internal arrangement. The rotary drum 115 differs in having a cylindrical peripheral wall 116 equipped with a plurality of ice-forming elements 117 in the form of hollow tubular fingers. Each of the fingers 117 is closed at its outer end and at its inner end is in communication with the interior of the drum. As shown in Figs. 5 and 6, each of the tubular fingers 117 may be formed with a portion 118 extending into the interior of the drum, the portion 118 being cut away for the promotion of circulation of refrigerant through the interior of the fingers. With the drum rotating in the direction of the arrow 119 in Fig. 5 and with the lower portion 118 of the finger turned in the direction of rotation, as shown, the lower portion 118 of the finger serves as a scoop to create turbulence for promoting flow of refrigerant into the interior of the finger.

Figure 8:
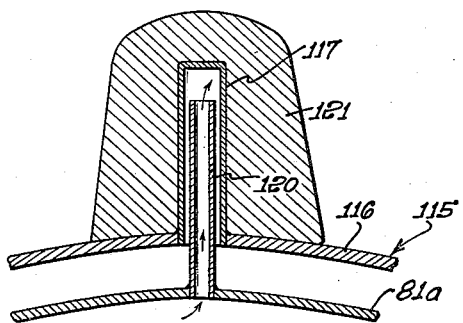
Fig. 8 is a view similar to Fig. 4, showing a modification of the finger arrangement.

Circulation of refrigerant through the hollow fingers 117 may be made even more efficient by employing the construction illustrated by Fig. 8. In Fig. 8, the cylindrical wall 81a inside the rotary drum 115 corresponding to the cylindrical wall 81 inside the cylindrical drum 12, is provided with a plurality of radial nozzles 120 corresponding to the plurality of hollow fingers 117, each of the radial nozzles extending into the corresponding hollow finger as shown. The function of the radial nozzles 120 is the same as the function of the spaced openings 85 in the cylindrical wall 81 in the first described form of the invention, the radial nozzles serving to distribute the inflowing refrigerant over the interior of the drum. Since the nozzles 120 extend into the ice-forming fingers 117, they cause relatively high velocity flow through the fingers with a consequent high rate of heat flow through the walls of the fingers.

Figure 7:
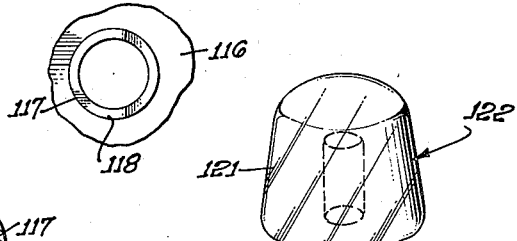
Fig. 7 is a perspective view of a typical block of ice that is produced by one of the hollow fingers.

As the rotary drum 115 rotates with refrigerant circulating therethrough in the manner heretofore described, small ice bodies build up around each of the hollow fingers 117 in an incremental manner as indicated by the ice formations 121 in Figs. 5 and 8. At the end of the freezing process, when the warm brine is circulated through the hollow fingers, the final product is released in the form of ice blocks or "cubes" of the configuration indicated at 122 in Fig. 7.

Figure 9:
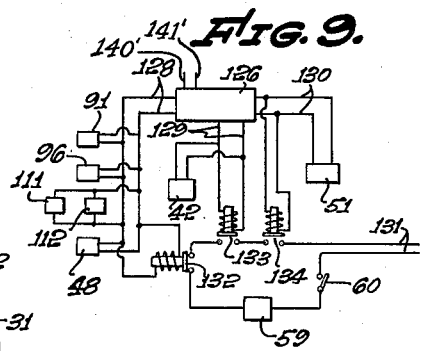
Fig. 9 is a wiring diagram of a control system that may be used to operate the apparatus in a fully automatic and cyclic manner.

A further feature of the preferred practice of the invention is the use of a control system for timing and operating the described apparatus automatically in continually repeated predetermined cycles. Such a control system may be constructed, for example, as indicated by Fig. 9. In Fig. 9, a timer 126 is adapted to energize a plurality of control circuits in predetermined time sequence. The circuits controlled by the timer 126 include a circuit 128 for energizing the two 3-way valves 91 and 96, the inlet valve 111 and the outlet valve 112 for the cooling coils 110, and the drain valve 48. A second circuit 129 controls the operation of the motor 42 that actuates the gate 36, the gate taking a normal closed position whenever the circuit is de-energized and opening whenever the circuit is energized. A third control circuit 130 energizes the motor 51 for actuating the water pump 50.

The timer 126 is constructed, arranged and adjusted for continual repetition of an operating cycle which begins with refrigerant circulating through the rotary drum and the rotary drum picking up water from the body of water in the main tank 11 for the formation of ice bodies at the ice-forming elements on the drum periphery. After a predetermined initial interval of time of a duration to permit completion of ice cubes on the rotating drum, the timer energizes the circuit 128 for actuation of the 3-way valves to substitute the circulation of warm brine through the drum, for actuation of the valves 111 and 112 to cut off circulation through the cooling coils 110 and for actuation of the drain valve 48 to permit water to be transferred by gravity from the main water tank 11 to the auxiliary tank 25.

After a further interval time of sufficient duration to permit complete drainage of the water to the auxiliary tank 25, the timer 126 de-energizes the control circuit 128 and simultaneously energizes the control circuit 129 to open the gate 36 for gravity discharge of the water-free ice cubes from the main water tank 11 onto the inclined chute 45. De-energization of the control circuit 128 actuates the 3-way valves for again circulating refrigerant through the rotary drum 12, opens the two valves 111 and 112 for circulation of refrigerant through the water-cooling coils 110 and closes the drain valve 48. After sufficient additional time has lapsed to permit complete discharge of the ice cubes from the tank 11, the timer 126 de-energizes the control circuit 129 to close the gate 36 and simultaneously energizes the third control circuit 130 for an interval of time sufficient to cause the water pump 50 to return all the water from the auxiliary tank 25 to the main water tank 11.

The electrically actuated supply valve 59 for controlling the flow of replenishing water into the tank 11 is energized by a separate circuit 131 in which the supply valve 59 is in series with the float switch 60 and is also in series with three relays 132, 133, and 134. All three of these relays are normally closed, i.e., closed when the coil of the relay is de-energized. The coils of the three relays 132, 133, and 134 are energized respectively by the three control circuits 128, 129 and 130. By virtue of this arrangement, the water supply valve 59 does not introduce new water in response to closing of the float switch 60 unless all three of the control circuits 128, 129 and 130 are de-energized. The supply valve 59 will not introduce new water, therefore, when the drain valve 48 is open, or when the gate 36 is open, or when the water pump motor 51 is actuating the water pump 50 for return of water from the auxiliary tank 25 to the main tank 11. When the water pump 50 ceases to operate, however, control of the supply valve 59 is returned to the float switch 60 to cause new water to be introduced if the water level drops below the level determined by the float switch.

Circuits 128, 129, 130 and 131 and timer 126 may be provided with electric power over two leads 140', 141' connected directly to the timer 126 and to circuits 128, 129, 130 and 131 through timer 126 as shown in Fig. 9.

The described apparatus may be constructed to freeze various quantities of ice in a single operating cycle, the contemplated quantities ranging from 50 lbs. to 1,000 lbs. per cycle. With the rotary drum operating at approximately five revolutions per minute, and with the described arrangement for highly efficient flow of refrigerant through the rotary drum, the freezing operation may be completed in a time interval on the order of 35 to 40 minutes. The resulting ice is crystal clear and entirely free of air. The ice discharged by the apparatus is much colder and much harder than ice cubes that are cut from large commercial blocks of ice.

Figure 13:
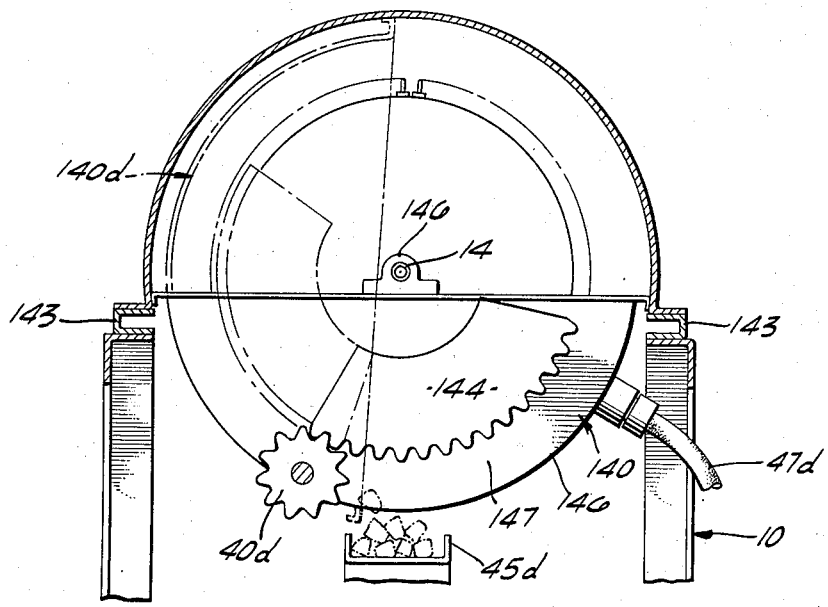
Fig. 13 is a sectional view of a particular type of water tank taken on the line 13—13 shown in Fig. 10.

In Fig. 10, a freezing unit is shown using accessories substantially identical with those shown in Fig. 1. This is with the exception of all the equipment utilized inside a water tank 11d. Still further, an ice body trough 45d is employed under the complete length of the water tank 11d as distinguished from the position of trough 45 shown in Fig. 1. Still further, a motor 42d is employed to rotate a pinion 40d to rotate a bottom portion 140 of tank 11d which is rotatable about a shaft 141 extending through bearings 87. Bottom portion 140 is rotatably separate and apart from a top portion 142 of water tank 11d. Top portion 142 may be maintained in a fixed position relative to frame 10 by means of welded plates 143. Both portions 140 and 142 are semicircular in cross section. As can be best seen in Fig. 13, lower portion 140 is provided with a gear 144 fixed to it to mesh with pinion 40d driven by motor 42d. Lower portion 140 is rotated to dump water into trough 45d after ice bodies have been formed by the unit. This is also after water in lower portion 140 has been drained via a flexible conduit 47d connected to drain valve 48. It is to be noted further that pipe 55 is also provided with a flexible conduit 145 to pump water into the lower portion 140, it being necessary that portion 140 be rotated to dump ice after the completion of a freezing cycle. It is to be noted in particular that in Fig. 13, lower portion 140 may be rotated to the position indicated at 140d to empty ice bodies deposited therein. Preferably, bottom portion 140 is provided with a half cylindrical pan 146 each end of which is closed by a semi-circularly shaped end panel 147.

Although a drum 148 is provided for the internal portion of the freezing unit shown in Fig. 10, this is not absolutely necessary. Preferably it is provided with means to house a layer of insulation 149 between its external surface and an internal partition 150. Inside the space between the external surface of drum 148 and partition 150 a coiled tube 151 is also provided having freezing elements 152 projecting into the interior of the tube and also through the outer shell of drum 148. They are also provided on the outer portions with disc-shaped insulators 153 which are made of a sheet material extending around freezing elements 152 adjacent the external surface of drum 148. Drum 148 is fixed at 154 to shaft 141 by means of weld fillets. Opposite ends 155 of coil 151 are threaded into shaft 141. Shaft 141 is provided with a partition 156 which may be substantially wider than as shown. That is, partition 156 may extend substantially the complete length of shaft 141 between ends 155 of coil 151. The necessary requirement being that opposite ends of shaft 141 be hollow for the circulation of fluid refrigerant therethrough. Fluid refrigerant is then circulated through the left end 155 of coil 151 and around the coil which is helical in shape and disposed preferably concentrically around both partition 150 and shaft 141. Freezing elements 152 are hollow and closed at their outer ends as shown in Fig. 10. They are open and provided with a scoop-shape at their inner ends 157. This arrangement as well as the direction of rotation of the shaft 141, in a specific nature of the scoop shape of 157 of elements 152 will be better understood in connection with later figures shown in the drawings.

The scoop-shaped inner end 157 of elements 152 is perhaps best shown in Figs. 11 and 12. It is to be noted that shaft 141 will be rotated in the direction of an arrow 158 whereas the direction of travel of coil 151 is in the direction of arrows 159. Still further, fluid refrigerant is circulated in the direction of arrows 159. Thus both by means of the rotation of the whole structure shown in Fig. 11 in the direction of arrow 158 and by the circulation of fluid refrigerant in the direction of arrows 159, the scoop-shaped inner ends 157 of freezing elements 152 cause the fluid refrigerant to be circulated into them as they are rotated toward the bottom. Thus as they are rotated toward the top where they are shown in Fig. 11, fluid refrigerant will be circulated out of elements 152. This permits reducing the temperature of elements 152, which are of course conductive, to an extremely low degree by this efficient circulation method. Still further, efficient use is made of the heat pump by insulating coil 141 from drum 148. This means that ice cannot easily form on drum 148 and heat is only withdrawn from the system by means of elements 152. This means that ice will form generally only on these elements. Still further, the use of insulator 153 operates in this same regard and still further makes bottom edges of ice bodies very similar to that shown in Fig. 7 have smooth bottom surfaces and therefore make them more pleasing in appearance and easier to use. Flow of fluid refrigerant into freezing element 152 is indicated at arrow 160 in Fig. 12.

An alternative embodiment of the invention is shown in Fig. 14. This embodiment is in some respects very similar to that shown in Fig. 8. However, several features of the invention shown in Figs. 10, 11 and 12 are incorporated in this embodiment of the invention. In the first place, a layer of insulation 161 is located between a first drum 162 and a second inner concentric drum 163. A partition or third drum 164 is then provided with nozzle means 165 to extend into a hollow tubular conductive freezing element 166 that extends through both first and second drums 162 and 163. Still a fourth drum 167 is positioned concentrically within partition or third drum 164 in a mechanical relationship analogous to the position of cylindrical wall 80 shown in the embodiment of the invention of Fig. 1. Still further, a disc-shaped insulator 168 is retained adjacent outer drum 162 by means of a snap ring 169 mounted in an appropriate circumferential groove 170 in projection 166.

The embodiment of the invention shown in Fig. 14 contains a number of features each of which may be employed in accordance with the invention without the other to substantial advantage. For example, a slip ring 169 may be employed to hold insulator 168 on projection 166 without the use of the other features of the invention. In addition, insulation 161 may be employed to insulate outer drum 162 from inner drum 163. Still further, the highly efficient distribution of fluid refrigerant in projection 166 via aligned nozzle means 165 in accordance with that shown in Fig. 8 may be employed alone. Still further the use of cylindrical wall or fourth drum 167 may be employed to minimize the amount of fluid refrigerant necessary to circulate through the unit as a whole and also provide an extremely efficient heat transfer path for fluid refrigerant circulated inwardly between drums 164 and 167, outwardly through nozzle means 165, and outwardly of the system between second and third drums 163 and 164.

Figure 15:
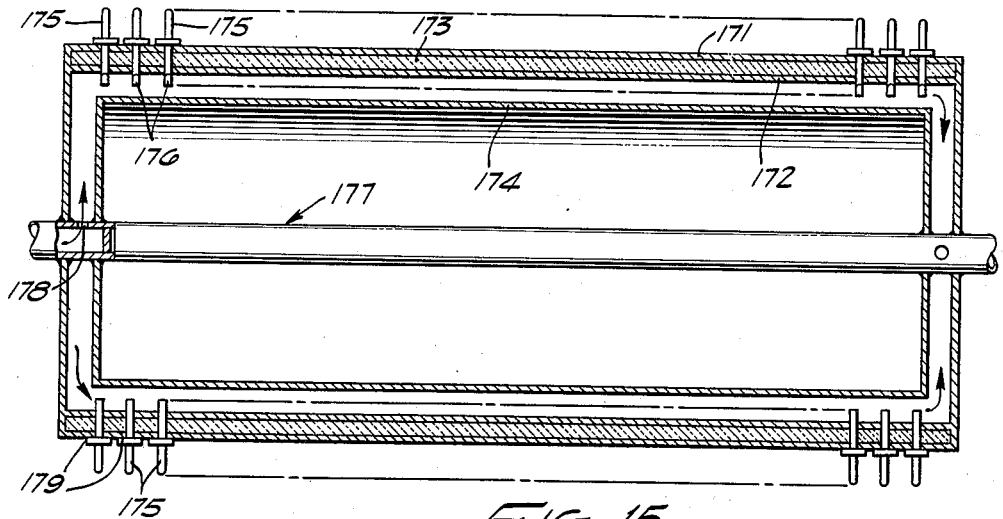
Fig. 15 is a sectional view of a drum type ice-making machine constructed in accordance with another embodiment of the invention.

An embodiment of the invention is shown in Fig. 15 which in many respects is analogous to that shown in Fig. 14. In the first place an outer drum 171 is employed with an inner drum 172 between which a layer of insulation 173 is positioned. Drums 171 and 172 with a wall member 174 are mounted concentrically within drum 170 and is then used in the same manner as coil 151 in drum 148 shown in Fig. 12, i.e. to reduced fluid flow volume. Specifically projections 175 project through the walls of drums 171 and 172 and through insulation 173 into the space between drums 172 and 174 and are provided with scoops 176 at their lower ends to scoop up fluid refrigerant as all three drums 171, 172 and 174 are rotated simultaneously on a shaft 177 to which they are fixed. Fluid refrigerant is circulated axially in the space between drums 172 and 174 by means not shown. Fluid refrigerant is in fact circulated through opposite hollow ends of shaft 177 through apertures 178 and thus axially along the freezing unit between drums 172 and 174. As before, freezing elements 175 are preferably provided with insulators 179 extending around their base portions adjacent the external surface of drum 171.

Figure 16:
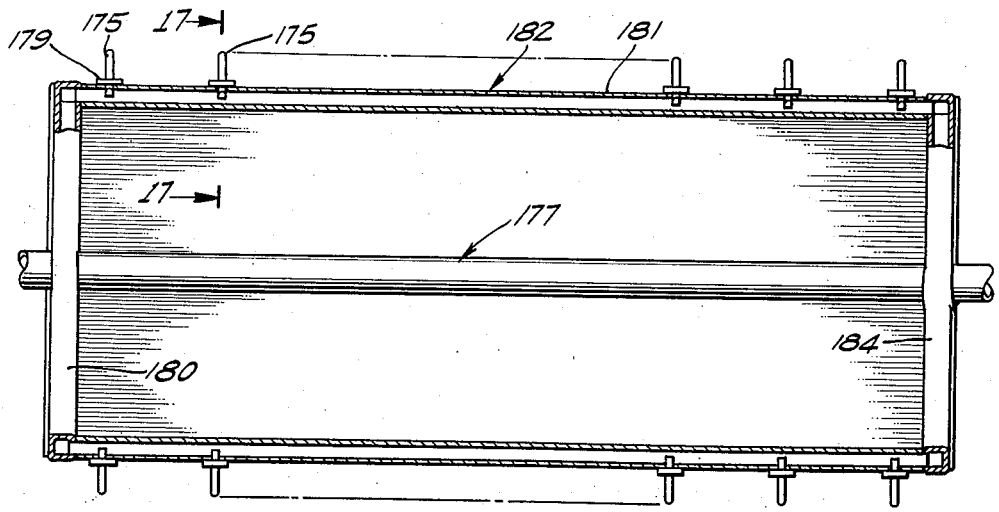
Fig. 16 is a sectional view of a drum type machine for making ice bodies constructed in accordance with still another embodiment of the invention.
Figure 17:
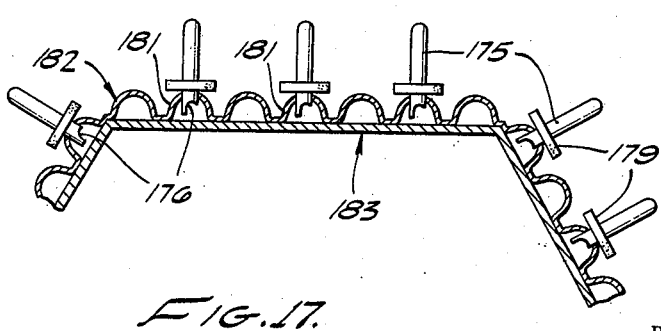
Fig. 17 is a sectional view of the ice-making machine taken on the line 17—17 shown in Fig. 16.

In Fig. 16 another arrangement is shown using a drum, freezing elements 175 and insulators 179 fixed in the same manner as shown in Fig. 15 on shaft 177 without insulation 173 or inner drum 172. In particular, an input header 180 is provided to circulate fluid refrigerant axially through corrugations 181 in a piece 182 of corrugated sheet material fixed to a hexagonal conductive sheet 183 providing a drum-like shape for the freezing unit. Input header 180 is connected to shaft 177 and is in open communication thereto. An output header 184 to collect fluid refrigerant after it is passed through corrugations 181 at the right end of the unit is viewed in Fig. 16. This is also in free and open communication with shaft 177 at its hollow right end. Fluid refrigerant flow is thus into the hollow left end of shaft 177 into input header 180 through corrugations 181 in output header 184 and out through the hollow right end of shaft 177. It is to be noted that freezing elements 175 project into the interior of corrugations 181. Scoop-shaped portions 176 may be turned in a direction facing the flow of fluid refrigerant axially through corrugations 181 or at an angle intermediate that position and the position shown in Fig. 17. Generally the most efficient angle at which they may be turned will be determined by the engineering requirements of the unit to be built.

Figure 18:
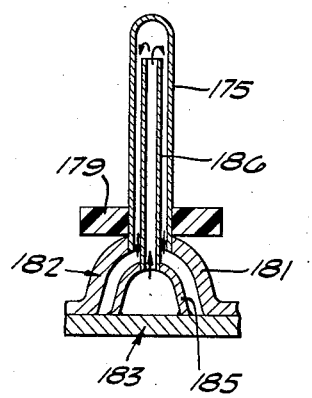
Fig. 18 is an enlarged broken away sectional view of a projection which may be used in the ice-making machine shown in Fig. 16.

It is to be noted that many other combinations of the different features of the invention may be incorporated without departing from the true scope of the invention. Another such example is the feature shown in Fig. 8 combined with the unit shown in Figs. 16 and 17. Such a combination is shown in Fig. 18 wherein a tunnel-shaped member 185 is shown having substantially the same curvature corrugations 181 and located interiorly thereof. Each of these are provided with nozzle means 186 to extend into the interior of freezing elements 175. The flow of fluid refrigerant in this case then is through input header 180, in the space between drum-shaped member 183 and tunnel-shaped member 185, outwardly through nozzle means 186 into the interiors of freezing elements 175 and to the right between corrugations 181 and tunnel-shaped members 185 as viewed in Fig. 16 and outwardly through output header 184.

My description in specific detail of the selected embodiments of the invention will suggest to those skilled in the art various changes, substitutions and other departures from my disclosure that properly lie within the spirit and scope of the appended claims.

This application is a continuation-in-part of my copending application entitled "Apparatus for Making Ice Cubes," Serial No. 388,120 filed October 26, 1953 and now abandoned.

What is claimed is:

1. In an apparatus of the character described for making small blocks of ice, the combination of: a tank containing a body of fresh water; a cylindrical drum having a plurality of peripheral conductive elements for forming small bodies of ice; a substantially horizontal rotary shaft united with and supporting said drum for rotation with at least a portion of the periphery of the drum immersed in the water in said tank, said shaft having an inflow passage and an outflow passage for circulation of fluid through the drum; a cylinder inside said drum and united therewith in communication with said inflow passage, said cylinder forming with said drum a rotary annular space and having spaced apertures to direct the inflowing fluid across said space, thereby to distribute the inflowing fluid over the inner circumferential surface of the drum; power means to rotate said shaft and drum; and means in communication with said two passages to circulate refrigerant through the drum to freeze water at said ice-forming elements.

2. A combination as set forth in claim 1 which includes an additional smaller cylinder inside said first mentioned cylinder and forming therewith an annular passage for fluid flow to the spaced apertures in said first mentioned cylinder.

3. In an apparatus of the character described for making bodies of ice, the combination of: a cylindrical drum having a peripheral wall forming a plurality of external elements for forming bodies of ice; shaft means united with and rotatably supporting said drum, said shaft means having a first passage for fluid flow into the drum and a second passage for fluid flow out of the drum; a tank to hold a body of water to immerse at least a portion of the periphery of said drum, thereby to supply water to said elements; a source of refrigerant; a source of relatively warm fluid; valve means to selectively connect said two sources with one of said shaft passages; valve means to selectively connect said two sources with the other said shaft means to drain water from said tank at the end of a freezing operation; means to discharge the ice bodies from said tank; and electrical control means including timer means to operate said valve means, drain means and discharge means for an automatic cycle including a freezing operation to form the ice bodies, a thawing operation by the warm fluid to release the ice bodies from the drum to the tank, a draining operation to release the water from the tank and a discharging operation to release the ice bodies from the drain tank.

4. A combination as set forth in claim 3 which includes means in said tank in communication with said source of refrigerant to pre-cool said body of water; an auxiliary tank to receive the water drained from the first mentioned tank; and which includes means under control of said timer means to return the water to the first mentioned tank.

5. A combination as set forth in claim 4 which includes automatic means to replenish water in said first mentioned tank as required.

6. A combination as set forth in claim 5 which includes means to prevent flow of replenishment water into said first mentioned tank during said cycle of operation in the time interval between the initiation of drainage flow from the first tank and the completion of the return of water to the first tank from said auxiliary tank.

7. In an apparatus of the character described for making small blocks of ice, the combination of: a tank containing a body of fresh water; a cylindrical drum having a plurality of peripheral conductive elements for forming small bodies of ice; a substantially horizontal rotary shaft united with and supporting said drum for rotation with at least a portion of the periphery of the drum immersed in the water in said tank, said shaft having an inflow passage and an outflow passage for the circulation of fluid through the drum; a cylinder inside said drum and united therewith to form an annular passage, one end of said passage being in communication with said outflow passage, the other end of the annular passage being closed, said cylinder having spaced apertures for outward flow into said space to distribute the inflowing fluid over the inner circumferential surface of the drum; power means to rotate said shaft and drum; and means in communication with said two passages to circulate refrigerant through the drum to freeze the water at said ice-forming elements.

8. A unit of the character described for connection with a source of refrigerant for the manufacture of ice, said unit having in combination: a cylindrical drum having a peripheral wall forming a plurality of external elements for forming bodies of ice; shaft means rotatably supporting said drum, said shaft means having a first passage for fluid flow into the drum and a second passage for fluid flow out of the drum; a tank to hold a body of water to immerse at least a portion of the periphery of said drum thereby to supply water to said elements; a source of fluid warmer than the refrigerant; a pump connected to one of said passages for forced circulation of fluid through the drum; valve means for connecting said source of refrigerant and said source of warm fluid with said pump selectively; valve means for connecting said source of refrigerant and said source of warm fluid with said other shaft passage selectively, said tank, pump and source of warm fluid being structurally interconnected as parts of a single unit; and cooling means in said tank for connection with said source of refrigerant for circulation of the refrigerant through the cooling means to pre-cool said body of water.

9. A unit of the character described for connection with a source of refrigerant for the manufacture of ice, said unit having in combination: a cylindrical drum having a peripheral wall forming a plurality of external elements for forming bodies of ice; shaft means rotatably supporting said drum, said shaft means having a first passage for fluid flow into the drum and a second passage for fluid flow out of the drum; a tank to hold a body of water to immerse at least a portion of the periphery of said drum thereby to supply water to said elements; a source of fluid warmer than the refrigerant; a pump connected to one of said passages for forced circulation of fluid through the drum; valve means for connecting said source of refrigerant and said source of warm fluid with said pump selectively; valve means for connecting said source of refrigerant and said source of warm fluid with said other shaft passage selectively, said tank, pump and source of warm fluid being structurally interconnected as parts of a single unit; cooling means in said tank for connection with said source of refrigerant for circulation of the refrigerant through the cooling means to pre-cool said body of water; said cooling means being connected to one side of said pump and to one of said shaft passages; and means to cut off said cooling means from said pump when said warmer fluid is being pumped through said shaft passages.

10. In an apparatus of the character described for making small blocks of ice, the combination of: a tank containing a body of fresh water; a cylindrical drum having a plurality of peripheral elements for forming small bodies of ice; a substantially horizontal rotary shaft united with and supporting said drum for rotation with at least a portion of the periphery of the drum immersed in the water in said tank, said shaft having an inflow passage and an outflow passage for the circulation of fluid through the drum; a cylinder inside said drum and united therewith to form an annular passage, one end of said passage being in communication with said outflow passage, the other end of the annular passage being closed, said cylinder having spaced apertures for outward flow into said space to distribute the inflowing fluid over the inner circumferential surface of the drum; power means to rotate said shaft and drum; means in communication with said two passages to circulate refrigerant through the drum to freeze the water at said ice-forming elements; and a second inner cylinder united with said shaft inside said first-mentioned cylinder to form therewith a second annular passage in communication with said apertures in the first-mentioned cylinder, said second annular passage being closed at one end and being in communication with said inflow passage at the other end.

11. In an apparatus of the character described for making small blocks of ice, the combination of: a tank containing a body of fresh water; a cylindrical drum having a plurality of peripheral elements for forming small bodies of ice; a substantially horizontal rotary shaft united with and supporting said drum for rotation with at least a portion of the periphery of the drum immersed in the water in said tank, said shaft having an inflow passage and an outflow passage for the circulation of fluid through the drum; a cylinder inside said drum and united therewith to form an annular passage, one end of said passage being in communication with said outflow passage, the other end of the annular passage being closed, said cylinder having spaced apertures for outward flow into said space to distribute the inflowing fluid over the inner circumferential surface of the drum; power means to rotate said shaft and drum; means in communication with said two passages to circulate refrigerant through the drum to freeze the water at said ice-flowing elements; and at least one cooling coil in said tank in communication with said refrigerant-circulating means to pre-cool said body of water.

12. In ice-making apparatus, including a water tank, the combination comprising: a refrigerant fluid container having a plurality of spaced, conductive projections extending therefrom, said projections being hollow, closed at their outer ends, and in free and open communication with the interior of said container at their inner ends; means to circulate a fluid refrigerant through said container in heat exchanging relationship with said projections; second means to immerse said projections periodically in the water contained in said tank; third means to circulate said fluid refrigerant into and out of the interior of said projections; said container being provided with refrigerant input means and an output port; and wherein said means comprises a partition defining a substantially enclosed space with said container, said projections in said output port being in the portion of the surface of said container defining said enclosed space with said partition, and said input means being outside of the portion of the surface of said container; and nozzle means fixed with and extending through said partition and having a cross-section smaller than and extending partially into the interior of each of said projections.

13. In ice-making apparatus including a fluid refrigerant source and a tank to hold water, the combination comprising: a fluid refrigerant container having a plurality of spaced, tubular, conductive projections extending therefrom; nozzle means for each of said projections; means to circulate said fluid refrigerant through said nozzle means at a velocity to produce a jet stream of said fluid refrigerant at each of the ends of said nozzle means, said nozzle means being located internally of said fluid refrigerant container in a position to direct said jet streams into the interiors of corresponding projections to provide a flow of said fluid refrigerant in a highly efficient heat exchanging relationship therewith; and means to immerse said projections periodically in said water to cause hard, crystal clear ice bodies to form thereon.

14. The invention as defined in claim 13, wherein said nozzle means extend inwardly into the interior of said projections.

15. In ice-making apparatus including a fluid refrigerant source and a tank to hold water, the combination comprising: a cylindrical drum having a plurality of tubular conductive projections united with its cylindrical external surface, said projections being hollow and being closed at their outer ends and in open communication with the interior of said drum at their inner ends; nozzle means aligned with said projections; and means to circulate said fluid refrigerant through said nozzle means at a velocity to produce a jet stream at each of the ends of said nozzle means extending into the interior of said projections; and means to rotate said drum to immerse said projections in said water.

16. In ice-making apparatus including a fluid refrigerant source and a tank to hold water, the combination comprising: a first cylindrical drum having a plurality of spaced tubular conductive projections extending therefrom; a second cylindrical drum having nozzle means extending therefrom in aligned relation with said projections; means to circulate the fluid refrigerant through said nozzle means at a velocity to produce a jet stream thereof extending into the interior of said projections; a third cylindrical drum encircling said first cylindrical drum but being provided with apertures for said projections to project therethrough, said third cylindrical drum thereby preventing said water from contacting said second drum; and means for rotating all three of said drums simultaneously to immerse said projections periodically in said water.

17. An ice-making machine comprising: a first drum having a plurality of conductive tubular projections extending therefrom; a second drum concentric with said first drum having nozzle means united therewith in aligned relation with said projections; a third drum inside and concentric with said second drum to facilitate efficient circulation of a fluid refrigerant into the space between said second and third drums and outwardly through said nozzle means; a fourth drum concentric with said first drum extending exteriorly thereof, said fourth drum having apertures to permit the extension of said projections therethrough; a layer of insulation between said first and fourth drums; means to circulate a fluid refrigerant into the space between said second and third drums and outwardly through said nozzle means, into the interior of said projections, outwardly into the space between said first and second drums, and out of the space between said first and second drums; an insulator of a sheet material extending around each of said projections adjacent said fourth drum, said projections having an external groove immediately above said insulator; and a snap ring around each of said projections in a corresponding groove to maintain corresponding insulators in place on said projections.

18. An ice-making machine comprising: a drum; a first corrugated sheet fixed to the drum; nozzle means extending from said first corrugated sheet, said first corrugated sheet forming passageways for the circulation of a fluid refrigerant through them and subsequently through said nozzle means; a second corrugated sheet having corrugations in phase with the corrugations of said first corrugated sheet; a plurality of projections extending from corrugations in said second corrugated sheet closed at their outer ends, said projections being maintained in aligned relation with said nozzle means; an insulator of a sheet material extending around each of said projections adjacent said second corrugated sheet; means to circulate a fluid refrigerant through the passageways formed by said first corrugated sheet in said drum, through said nozzle means into the interior of said projections, and outwardly of said machine between said first and second corrugations; and means to immerse said projections periodically in water.

19. In ice-making apparatus including a fluid refrigerant source and a tank to hold water, the combination comprising: a substantially drum-shaped fluid refrigerant container rotatably mounted about its longitudinal axis, said container including input and output headers and a plurality of longitudinal passageways in open communication with said headers for parallel flow of fluid refrigerant therethrough; a plurality of rows of tubular projections closed at their outer ends and in free and open communication with said passageways, said projections having scoop-shaped ends and positioned interiorly of said passageways to scoop up fluid refrigerant circulated therein; means to circulate fluid refrigerant through said input header, through said passageways, and through said output header; and means to rotate said cylinder both to circulate fluid refrigerant into and out of said projections and to immerse said projections periodically in said water.

20. The invention as defined in claim 19, wherein said container is a polygonal drum, and wherein said passageways are formed by a corrugated piece of sheet material.

21. In ice-making apparatus including a fluid refrigerant source and a tank to hold water, the combination comprising: a shaft hollow at each end having a solid partition separating its hollow ends, a coiled tube fixed at its opposite ends to said hollow ends of said shaft and encircling said shaft; a drum encircling said coil and fixed to said shaft; a layer of insulation positioned between said coil and said drum; a plurality of tubular conductive projections closed at their outer ends and extending through peripheral portions of both said coil and said drum, said projections having scoop shaped ends extending into the interior of said coil to scoop up fluid refrigerant circulated therein and means to circulate a fluid refrigerant inwardly through one hollow end of said shaft through said coil, and outwardly through the opposite hollow ends of said shaft; and means to immerse said projections periodically by rotating said shaft while said drum is partially submerged in said water in said tank.

22. An ice-making machine comprising a fluid refrigerant container having a plurality of spaced tubular conductive projections extending into the interior of said container in planes substantially through the longitudinal axis of said drum, said projections having scoop-shaped ends extending into the interior of said container in a position to scoop up fluid refrigerant therein and by rotational movement of said container about a longitudinal axis; a tank to hold water, a portion of said projections always being partially immersed in said water; means to circulate a fluid refrigerant axially through said container and means to rotate said container about a longitudinal axis in a direction both to cuse said scoops to be operative to urge said fluid refrigerant into the interior of said projections and to immerse said projectons periodically in said water.

23. The invention as defined in claim 22, wherein said fluid refrigerant container is a cylindrical drum.

24. The invention as defined in claim 22, wherein said fluid refrigreant container is a helically coiled tube having said projections extending radially from its turns.

25. An ice-making machine comprising: a first cylindrical drum having a plurality of spaced tubular conductive projections extending therefrom, said projections being provided with scoops extending into the interior of said drum to urge a fluid refrigerant into said projections as said drum is rotated about its longitudinal axis; a tank to hold water, a portion of said projections always being submerged in said water; a second drum extending over the exterior of said first drum and being provided with apertures for the extension of said projections therethrough; a layer of insulation between said first and said second drums; a third drum inside said first drum to facilitate efficient flow of a fluid refrigerant between said first and third drums; an insulator made of a sheet material extending around each of said projections adjacent said second drum; means to circulate a fluid refrigerant axially between said first and third drums; and means to rotate all three of said drums while a portion of said projections is submerged in water and thereby to periodically immerse all of said projections in said water, all of said drums being concentric.

26. In an apparatus of the character described for making small blocks of ice, the combination of: a tank containing a body of fresh water; a cylindrical drum having a plurality of radially projecting hollow peripheral elements to serve as cores for forming small bodies of ice, the interiors of said elements being open to the interior of the drum; a substantially horizontal rotary shaft united with and supporting said drum for rotation with at least a portion of the periphery of the drum immersed in the water in said tank, said shaft having an inflow passage and an outflow passage for circulation of fluid through the drum; and means extending into the interior of the drum at each of said elements to serve as a scoop to create turbulence for promoting flow of refrigerant into the interior of the element.

27. In ice-making apparatus including a water tank, the combination comprising: a fluid refrigerant container having a plurality of spaced, conductive projections tubular in shape positioned around at least a portion of the periphery of the container; first means to circulate a fluid refrigerant through said container in heat exchanging relationship with said projections, said projections being hollow, open at one end and closed at the other, and in communication with the interior of said container at their open ends; second means to rotate said container on an axis to immerse said projections periodically in said water; and third means extending into the interior of said container at each of said projections to serve as a scoop to create turbulence and promote a flow of said refrigerant into and out of the interior of said projections, flow of said refrigerant out of said projections being facilitated by turning said projections up-side-down as said container is rotated.

28. Ice making apparatus comprising: a substantially cylindrical drum having hollow conductive projections extending radially therefrom; means to circulate a fluid refrigerant into and out of said projections; means to rotate said drum simultaneously as fluid refrigerant is circulated into and out of said projections; a semi-circular pan under said drum to hold water in contact with only a portion of said projections at one time; ice receiving means below said pan; and means to rotate said pan about the rotational axis of said drum to permit ice bodies formed on said projections to fall to said ice receiving means.

29. Ice making apparatus comprising: a substantially cylindrical drum having hollow conductive projections extending radially therefrom; means to circulate a fluid refrigerant into and out of said projections; means to rotate said drum simultaneously as fluid refrigerant is circulated into and out of said projections; a semi-circular pan under said drum to hold water in contact with only a portion of said projections at one time; ice receiving means below said pan; means to rotate said pan about the rotational axis of said drum to permit ice bodies formed on said projections to fall to said ice receiving means; a cold water tank; a flexible conduit connected from said pan to said cold water tank to drain water from said pan in preparation for dumping ice bodies onto said ice receiving means; a valve to shut said water tank off from said pan; a common flexible conduit connected to said pan; a check valve; a pump connected from said cold water tank to said check valve; a fresh water conduit having a valve therein, said check valve and said fresh water conduit being connected to said common conduit; a float switch in said pan to operate said fresh water conduit valve when the water level in said pan falls below a predetermined minimum height; and means for simultaneously operating said pump and disabling said fresh water conduit valve.

30. Ice making apparatus comprising: a substantially cylindrical drum having hollow conductive projections extending radially therefrom; means selectively operable to circulate a fluid refrigerant into and out of said projections to cause ice bodies to form thereon by periodic immersion of said projections in water, and subsequently to circulate a warming fluid into and out of said projections to cause ice bodies on the under side of said drum to fall off of it as said drum is rotated, means to rotate said drum simultaneously both as said fluid refrigerant and said warming fluid is circulated into and out of said projections; a semi-circular pan under said drum to hold water in contact with only a portion of said projections at one time; ice receiving means below said pan; and means to rotate said pan about the rotational axis of said drum to permit ice bodies formed on said propections on the lower side of said drum to fall to said ice receiving means as said drum is rotated while said warming fluid is circulated into and out of said projections.

31. Ice making apparatus comprising: a substantially drum shaped fluid refrigerant container rotatably mounted about its longitudinal axis, said container including input and output headers and a plurality of longitudinal passageways in open communication with said headers for parallel flow of fluid refrigerant therethrough; means to circulate fluid refrigerant through said input header therough said passageways, and through said output header; a plurality of rows of conductive tubular projections closed at their outer ends and in free and open communication with said passageways, said projections having scoop-shaped ends and positioned interiorly of said passageways to scoop up fluid refrigerant as it is circulated in said passageways; a water tank to hold water in contact with said projections on the under side of said drum as it is rotated; and means to rotate said drum to immerse said projections periodically in said water.

References Cited in the file of this patent
UNITED STATES PATENTS

| | | |
|---|---|---|
| 896,637 | Herrman | Aug. 18, 1908 |
| 2,403,275 | Gilliam | July 2, 1946 |
| 2,405,273 | Smith | Aug. 6, 1946 |
| 2,414,264 | Kirkpatrick | Jan. 14, 1947 |
| 2,493,149 | Kirkpatrick | Jan. 3, 1950 |